310-334 SR

XR 3,846,649

United States Patent [19]

Lehmann et al.

[11] 3,846,649

[45] Nov. 5, 1974

[54] PIEZOELECTRIC TRANSDUCER COMPRISING ORIENTED ZINC OXIDE FILM AND METHOD OF MANUFACTURE

[75] Inventors: Hans Wilhelm Lehmann, Hedingen; Roland Widmer, Rumlang, both of Switzerland

[73] Assignee: RCA Corporation, New York, N.Y.

[22] Filed: June 18, 1973

[21] Appl. No.: 370,616

[52] U.S. Cl. .......... 310/8, 310/9.5, 310/9.6, 333/30 R

[51] Int. Cl. .......... H01v 7/02, H04r 17/00

[58] Field of Search .......... 310/8, 9.5, 9.6; 333/30 R, 333/72

[56] References Cited

UNITED STATES PATENTS 3,206,698 9/1965 Allen et al. .......... 333/30 R
3,453,456 7/1969 Oltman, Jr. et al. .......... 333/30 R X
3,469,120 9/1969 Nagao et al. .......... 310/9.5

*Primary Examiner*—Mark O. Budd
*Attorney, Agent, or Firm*—Glenn H. Bruestle; William S. Hill

[57] ABSTRACT

A transducer capable of generating shear waves at microwave frequencies in a propagation medium, comprising an oriented polycrystalline film of zinc oxide on a substrate which is a film of zinc, $In_2O_3$, or $In_2O_3$/-$SnO_2$. The zinc oxide film is deposited by rf sputtering, with the substrate surface oriented 45° with respect to the sputtering target.

5 Claims, 2 Drawing Figures

PIEZOELECTRIC TRANSDUCER COMPRISING ORIENTED ZINC OXIDE FILM AND METHOD OF MANUFACTURE

BACKGROUND OF THE INVENTION

There is a need for microwave delay lines operating in the GHz range. In order to launch ultrasonic waves in the delay medium, an ultrasonic transducer is needed which operates in the microwave frequency range. The transducer thickness required for devices of this kind is of the order of a micron. This is because the transducer thickness should be equal to an odd multiple of half of the mechanical wavelength in the piezoelectric material. For example, a ZnO shear wave transducer operating at 4.5 GHz should have a thickness of 0.3u for operating in the fundamental mode.

Previously, thin film piezoelectric transducers have been made mainly from CdS. This material was easily evaporated but great care had to be taken to obtain films of high resistivity and proper orientation.

It was then found that ZnO films were better than CdS films for thin film transducers because, although ZnO has the same crystal structure as CdS, ZnO has about a factor of two larger electromechanical coupling coefficient than CdS, both for longitudinal and shear wave generation.

Adherent, highly resistive, piezoelectric thin films of ZnO have been prepared by rf-sputtering. If prepared under proper conditions, these films have a high degree of preferred orientation and have properties such that they can be used as ultrasonic transducers. If ZnO is rf-sputtered onto amorphous substrates such as glass, quartz, and the like, with the substrate parallel to the sputtering target, a film is formed which has a preferred orientation with the polar c-axes of the crystallites being perpendicular to the substrate. This is the proper orientation for the generation of longitudinal ultrasonic waves.

Although thin film transducers with perpendicular orientation are preferred for some applications, there is also a demand for low-loss shear wave transducers. One reason for this demand is that the velocity of shear waves is usually 1.5 to 2 times less than that of longitudinal waves in the same material. This lower velocity has the advantage that, for a given length of delay line, longer delays can be obtained. Also, the diffraction losses for shear waves are smaller than for longitudinal waves.

The present invention relates to piezoelectric transducers comprising polycrystalline films of ZnO which are useful for generating shear ultrasonic waves. In these films, the polar c-axes of a substantial proportion of the ZnO crystallites must lie in a plane which is parallel to the plane of the substrate surface. This type of orientation will be referred to as "parallel" orientation. The c-axes must also be parallel to each other.

Previously, it was believed necessary to use single crystal layers of ZnO to get a high enough coupling coefficient with the transducer substrate. But the deposition of single crystal ZnO films is difficult and costly. With this invention, polycrystalline films can be used and the coupling coefficient is nearly as high as for single crystal layers.

A principal difficulty in fabricating shear wave transducers from ZnO is that of overcoming the strong tendency of ZnO films to grow with perpendicular orientation. This tendency has previously been overcome using a method in which xylene vapor was added to the sputtering gas. Thus, a thin organic polymer film was obtained on the substrate on which the ZnO film grew in parallel orientation. In this method, the substrate was tilted 45° with respect to the target. Although the transducer properties of these films were satisfactory, the films exhibited too weak adherence to the substrate because of the presence of the organic film.

The present invention also involves an improved method by means of which ZnO films having parallel orientation can be deposited on a substrate with good adherence. The improvement resides in the discovery of two substrate surfaces which permit the deposition of ZnO films having the desired properties of parallel orientation and good adherence.

THE DRAWING

FIG. 1 is a greatly magnified view illustrating the oriented relationship of ZnO crystallites deposited on a substrate in the method of the invention, and FIG. 2 is an isometric view of a transducer and delay line in accordance with the present invention.

DESCRIPTION OF PREFERRED EMBODIMENTS

Figure 1:
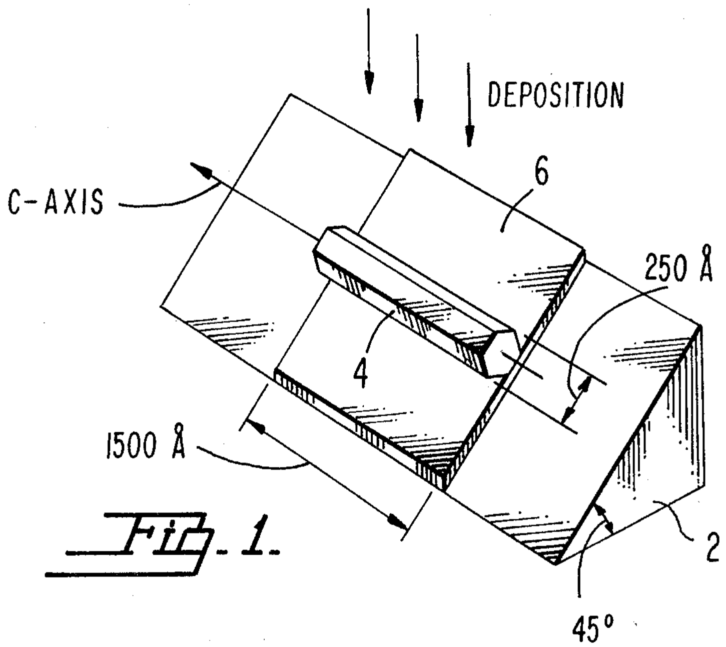

It has been found that the orientation of a sputter-deposited ZnO film is strongly dependent upon the crystalline orientation of the substrate surface. Previously, it was conventional to deposit ZnO films on a counterelectrode consisting of a 100 A thick lower film of chromium and a top film of gold having a thickness of 1,000 A. However, only perpendicularly oriented ZnO films have been able to be deposited on this type of substrate. The chromium-gold combination has been used because of its excellent adherence properties.

In developing the present invention, a number of different metals were deposited by evaporation or by sputtering and attempts were made to deposit parallel oriented ZnO films on the metal surfaces. Of the metals tried, only sputtered zinc films enabled deposition of ZnO films having a certain degree of parallel orientation. The zinc film should be deposited immediately before the ZnO film. The Zn film is deposited by rf-sputtering a zinc target in an argon atmosphere. Thickness of the deposited zinc film may be of the order of 1,000 A. The zinc film is preferably deposited on top of a chromium-gold film.

Another (and more satisfactory) substrate is a 1,000 A thick film of 80% $In_2O_3$/20% $SnO_2$ deposited directly on a magnesium aluminate spinel substrate without any intervening chromium-gold film. This film can be deposited by rf sputtering from a target which is 80% In/20% Sn. For best results the substrate should be oriented 45° with respect to the sputtering target. Sputtering is carried out in pure oxygen at a pressure of 7m Torr. The substrate is kept at a temperature of 400° C and the power is 300 watts. This results in a deposition rate of 60 A/min. The sputtered films have a resistivity on the order of $5 \times 10^{-3}$ Ω cm and show pronounced 111 orientation.

Using either of the above counterelectrodes on a magnesium aluminate spinel crystal substrate, shear wave transducers can be prepared using the following conditions:

Target: Pure zinc doped with 0.5% silver
Taret diameter: 100 mm
Sputtering gas: Pure oxygen Substrate Temp: 300° – 400° C
Angle between substrate and target: 45°
Target-substrate distance: 55mm
rf power: 300 watts
*Bias voltage: −100 V dc (with respect to the plasma which is present within the sputtering chamber during the sputtering operation)
Sputter rate: 120 A/min.
Sputtering gas pressure: 7m Torr

*The substrate can be biased negatively with respect to the plasma by proper tuning of the LC network of the anode. Normal biasing range for the deposition of these ZnO films is between −50 and −100 V.

ZnO films deposited on the zinc surface have a mat appearance and have a rather coarse structure when viewed under a scanning electron microscope. The mat appearance is believed due to the condition of the underlying zinc surface which is also rough.

The ZnO films deposited on the 80% $In_2O_3$/20% $SnO_2$ substrates have a perfectly smooth surface, are highly oriented with the c-axes of their crystallites parallel to the surface of the substrate, are highly insulating (typically $10^9$–$10^{11}$ Ω cm), and have good adherence. As transducers, they generate shear waves.

FIG. 1 illustrates the orientation of the crystallites. As shown in the Figure, the supporting body 2 has its top surface oriented at an angle of 45° with the surface of the sputtering target (not shown). The crystallites 4 being deposited on the 80% $In_2O_3$/20% $SnO_2$ substrate film 6 also are projected on the film at a 45° angle. The c-axis of each crystallite is oriented parallel with the surface of the substrate film. As shown in the drawing, the ZnO crystallites have a length of 1,500 A and a diameter of 250 A.

Targets made of ZnO can also be used to deposit oriented ZnO films. The preferred sputtering atmosphere using this type of target is 80% argon/20% oxygen. Zinc oxide targets can be prepared by hot pressing zinc oxide powder at 700° C and 200 Atm. pressure for 4 hours. Other optimum parameters are: pressure: 7m Toor; cathode voltage: −1,650 V; power density 2.5 W/cm$^2$; substrate bias: −50V; substrate temp: 400° C; substrate angle: 45°; sputtering time: 120 min; sputter rate: 142 A/min.

The presence or absence of a bias voltage has considerable effect on the characteristics of the film that is deposited. Application of a bias voltage between substrate and plasma aids in obtaining desired orientation of the sputter-deposited film. It also almost completely eliminates surface roughness in films deposited at an angle. Bias voltage also substantially eliminates wedge effect of film deposited at an angle. Without using a bias voltage, deposited films are usually thicker on the side closest to the target than they are on the side farther from the target. Wedge effect is very detrimental to transducer performance. For the examples which have been described, a bias voltage of −100 V on the substrate for pure oxygen, and a bias voltage of −75 V for a mixture of 80% Ar/20% $O_2$ results in films with a thickness variation of less than 1% over an area of 1 sq. cm.

It is desirable that the deposited ZnO films be highly resistive. When a silver-doped zinc target is used, the presence of the silver produces acceptor centers in the deposited ZnO and these centers increase the resistivity of the film.

Figure 2:
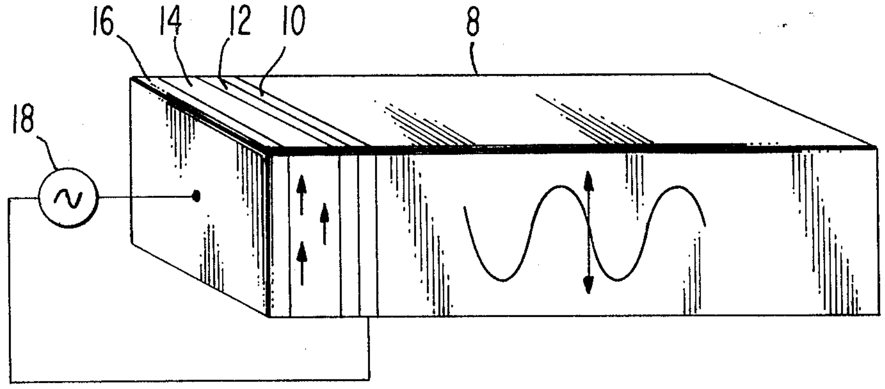

To make an apparatus comprising an ultrasonic transducer and a delay line, one provides (FIG. 2) a delay line body 8 composed of an elongated, rectangular shaped block of a material such as magnesium aluminate spinel having on one end an electrode film 10 of a metal such as molybdenum. On top of the molybdenum film 10 is a film 12 of 80% $In_2O_3$/20% $SnO_2$ deposited as described above. On top of the film 12 is a film 14 of oriented zinc oxide which is also deposited as described above. On the film 14 is an electrode film 16 which may also be of molybdenum or adherent metal such as gold. A signal generator 18 is connected across the electrodes 10 and 16.

When an electrical oscillation signal of microwave frequency is applied across the electrodes 10 and 16, ultrasonic shear waves are generated in the ZnO film 14 and these are propagated along the delay line body 8.

In laboratory samples of these devices, (i.e., a combination of 80% $In_2O_3$/20% $SnO_2$ and ZnO) a shear wave coupling coefficient of 0.27 has been measured at 400 MHz. This compares favorably with a coupling coefficient of 0.32 measured in single crystals of ZnO.

Although 80% $In_2O_3$/20% $SnO_2$ substrate films are preferred because they give the lowest resistivity within the indium oxide-stannic oxide system, pure indium oxide can also be used and other ratios of indium oxide-stannic oxide can be used. If other ratios of indium oxide-stannic oxide are used, care must be taken to select only ratios that have the desired orientation properties.

We claim:

1. A piezoelectric transducer comprising a polycrystalline film of parallel-oriented zinc oxide on a substrate comprising either a film of zinc, a film of $In_2O_3$ or a film of $In_2O_3/SnO_2$ capable of producing a parallel oriented film of ZnO, said last mentioned film being adhered to a body surface.

2. A transducer according to claim 1 in which said body is magnesium aluminate spinel.

3. Apparatus comprising an elongated body of a substance capable of transmitting ultrasonic waves of energy, said body having on one of its surfaces a piezoelectric transducer comprising a thin substrate film of either zinc or a film of $In_2O_3$, or a film of $In_2O_3/SnO_2$ which is capable of producing a parallel oriented film of ZnO, and a thin film of polycrystalline zinc oxide, oriented in the parallel mode, adhered to said first-mentioned film.

4. Apparatus according to claim 3 in which said body is composed of magnesium aluminate spinel.

5. Apparatus according to claim 4 including a signal generator connected across said transducer.

* * * * *